(12) United States Patent
Hu

(10) Patent No.: US 12,169,025 B2
(45) Date of Patent: Dec. 17, 2024

(54) CONTROL VALVE

(71) Applicant: HANGZHOU AO KE MEI RUI TECHNOLOGY CO., LTD., Zhejiang (CN)

(72) Inventor: Meiyan Hu, Zhejiang (CN)

(73) Assignee: HANGZHOU AO KE MEI RUI TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 18/027,364

(22) PCT Filed: Sep. 26, 2021

(86) PCT No.: PCT/CN2021/120575
§ 371 (c)(1),
(2) Date: Mar. 20, 2023

(87) PCT Pub. No.: WO2022/151759
PCT Pub. Date: Jul. 21, 2022

(65) Prior Publication Data
US 2023/0400108 A1   Dec. 14, 2023

(30) Foreign Application Priority Data
Jan. 18, 2021 (CN) .......................... 202110065261.1

(51) Int. Cl.
*F16K 11/08* (2006.01)
*F16K 5/04* (2006.01)
(Continued)

(52) U.S. Cl.
CPC ........ *F16K 11/0856* (2013.01); *F16K 5/0407* (2013.01); *F16K 5/0471* (2013.01);
(Continued)

(58) Field of Classification Search
CPC .. F16K 11/0856; F16K 5/0407; F16K 5/0471; F16K 11/085; F16K 11/0853; F16K 27/65
See application file for complete search history.

(56) References Cited

U.S. PATENT DOCUMENTS

| 3,658,093 A | 4/1972 | Kirkwood |
| 2002/0079003 A1* | 6/2002 | Scampini .............. F16K 5/0407 |
| | | 137/625.32 |

(Continued)

FOREIGN PATENT DOCUMENTS

| CN | 103742675 A | 4/2014 |
| CN | 206175729 U | 5/2017 |

(Continued)

OTHER PUBLICATIONS

International Search Report for PCT/CN2021/120575 mailed Nov. 30, 2021, ISA/CN.

(Continued)

*Primary Examiner* — Kevin R Barss
(74) *Attorney, Agent, or Firm* — Yue (Robert) Xu; Apex Attorneys at Law, LLP

(57) ABSTRACT

Disclosed is a control valve, which may comprise a valve body component, a valve element component and a sealing component. The valve body component comprises a side wall part and the sealing component comprises an elastic pad and a sealing member The sealing member comprises a sealing main body part comprising a flanging part and a matching part, which are connected to each other; the matching part makes contact with the valve element component and is in sliding fit with the valve element component the elastic pad is provided with a first through hole, and the first through hole is in communication with a communication hole; the sealing member is provided with a second through hole, and the second through hole is in communi- (Continued)

cation with the communication hole by means of the first through hole.

18 Claims, 13 Drawing Sheets

(51) Int. Cl.
*F16K 11/085* (2006.01)
*F16K 27/06* (2006.01)
(52) U.S. Cl.
CPC ........ *F16K 11/085* (2013.01); *F16K 11/0853* (2013.01); *F16K 27/065* (2013.01)

(56) References Cited

U.S. PATENT DOCUMENTS

| | | | | |
|---|---|---|---|---|
| 2018/0372235 | A1* | 12/2018 | Smith | .................. F16K 27/065 |
| 2019/0136989 | A1* | 5/2019 | Suzuki | ................ F16K 11/0876 |
| 2019/0249787 | A1* | 8/2019 | Whitaker | .............. F16K 11/076 |
| 2020/0011437 | A1* | 1/2020 | Lin | ....................... F16K 27/065 |
| 2023/0332696 | A1* | 10/2023 | Hu | ....................... F16K 11/0856 |
| 2023/0332697 | A1* | 10/2023 | Hu | ......................... F16K 3/243 |
| 2024/0173899 | A1* | 5/2024 | Hu | .................... B29C 45/14311 |

FOREIGN PATENT DOCUMENTS

| | | |
|---|---|---|
| CN | 107830207 A | 3/2018 |
| CN | 109424766 A | 3/2019 |
| CN | 110953378 A | 4/2020 |
| CN | 111828687 A | 10/2020 |
| CN | 111981164 A | 11/2020 |
| JP | S48-054521 U | 7/1973 |
| JP | H01-206168 A | 8/1989 |

OTHER PUBLICATIONS

First Office Action dated Mar. 5, 2024 for Japanese patent application No. 2023-543162, English translation provided by Global Dossier.

* cited by examiner

CONTROL VALVE

This disclosure is a national phase application of PCT international patent application PCT/CN2021/120575, filed on Sep. 26, 2021 which claims the priority to Chinese Patent Application No. 202110065261.1, titled "VALVE DEVICE", filed with the China National Intellectual Property Administration on Jan. 18, 2021, the entire disclosure of which are incorporated herein by reference.

FIELD

The present disclosure relates to the technical field of fluid control, and in particular to a control valve.

BACKGROUND

Some systems need to use a multi-passage control valve to control a flow path. For example, a motor vehicle may generally have multiple control valves in order to conduct controlling at present. In a multi-passage control valve, how to arrange a control valve to achieve better sealing is an urgent problem to be solved.

SUMMARY

In order to provide a control valve, the following technical solution is provided according to the present application:

a control valve includes a valve body component and a valve core component, the control valve has a valve cavity, at least part of the valve core component is located in the valve cavity, the valve core component is driven to be rotatable; the valve body component comprises a side wall portion, the side wall portion is a peripheral wall or at least a part of the peripheral wall of the valve cavity, the side wall portion has at least three communication holes which are in communication with the valve cavity, the control valve further includes a sealing component, the sealing component is located between the side wall portion and the valve core component, the sealing component includes an elastic pad and a sealing member, the elastic pad and the sealing member are fixedly connected to form an integral structure, the elastic pad is located between the sealing member and the side wall portion, the sealing member includes a sealing main body portion, the sealing main body portion includes a hemming portion and a fitting portion which are connected to each other, the fitting portion is in contact with and in sliding fit with the valve core component, the elastic pad has first through holes, the first through holes are in communication with the communication holes, the sealing member has second through holes, the second through holes are in communication with the communication holes through the first through holes, the hemming portion includes an outward bending portion which surrounds the corresponding second through hole and is connected to the elastic pad, and the outward bending portion is located between an inner surface, in contact with the valve core component, of the fitting portion and an outer surface, in contact with the side wall portion, of the elastic pad.

In the control valve provided according to the embodiments of the present application, the sealing component of the control valve includes the elastic pad and the sealing member which are in an integral structure, a sealing performance between the elastic pad and the sealing member is good, the sealing member is in contact with the valve core component. The sealing main body portion includes the hemming portion and the fitting portion which are connected to each other, the hemming portion includes the outward bending portion which surrounds the second through hole and is connected to the elastic pad, the outward bending portion is located between the inner surface of the fitting portion and the outer surface of the elastic pad, and thus, on one hand, it can increase the contact area between the elastic pad and the sealing member, thereby improving the adhesion force between the elastic pad and the sealing member, and, on the other hand, it can improve the collision performance between the valve core component and the edge of the outward bending portion when the valve core component rotates to the region where the second through hole is located, so as to prevent the risk of rotation blockage, driving force increase or fluid leakage.

DETAILED DESCRIPTION OF THE EMBODIMENTS

The features and exemplary embodiments of various aspects of the present disclosure are described in detail below. To make the objects, solutions and advantages of the present disclosure more clear and apparent, the present disclosure is described in detail in conjunction with the drawings and the specifically embodiments. Moreover, relational terms such as "first" and "second" etc. are only used to distinguish one element from another having the same name and do not necessarily require or imply any such actual relationship or order between those elements.

Figure 1:
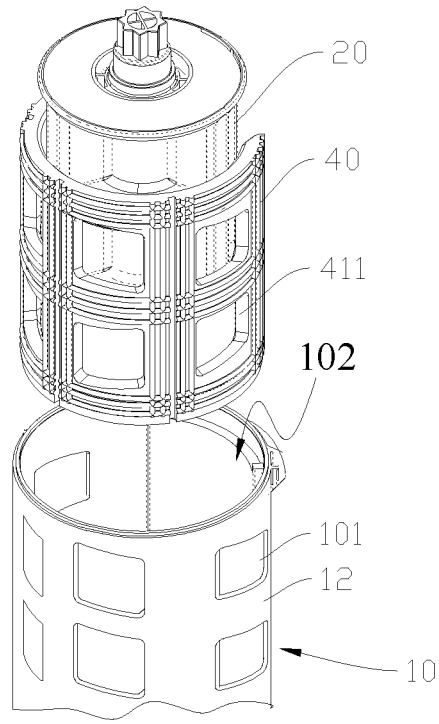
FIG. 1 is a schematic partially exploded view of a control valve according to the present application.
Figure 2:
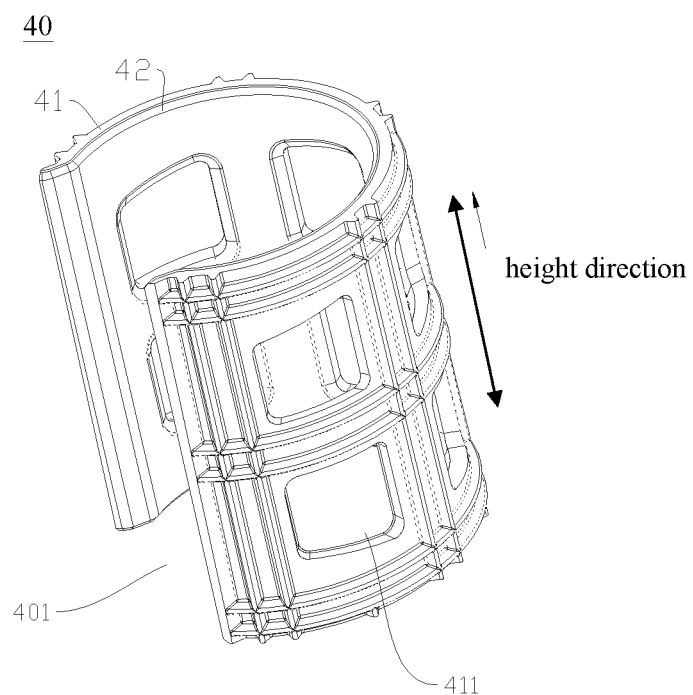
FIG. 2 is a schematic perspective view of a sealing component according to an embodiment of the present application.
Figure 3:
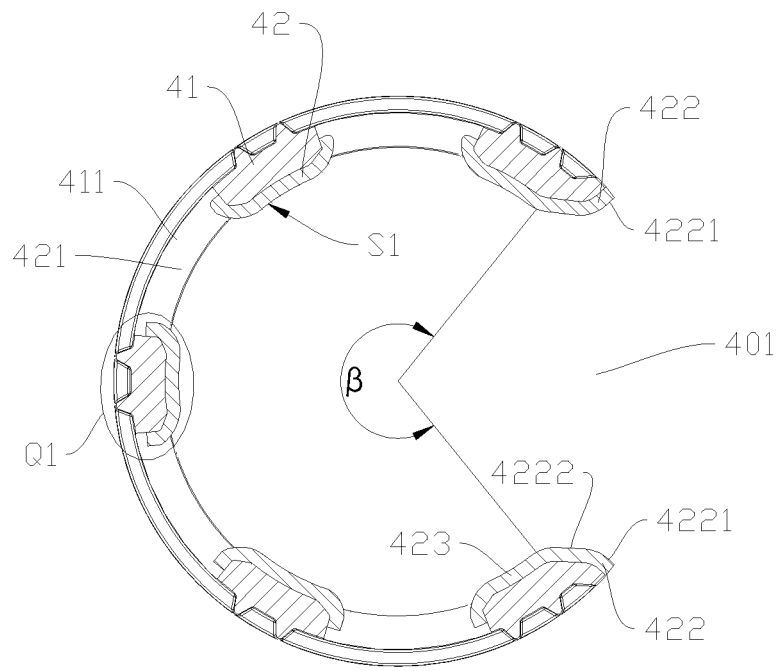
FIG. 3 is a schematic cross-sectional view of the sealing component shown in FIG. 2.

As shown in FIG. 1 to FIG. 3, a control valve 200 includes a valve body component 10, a valve core component 20, and a sealing component 40. The control valve has a valve cavity 102. The control valve 200 further includes a control box, and the valve core component 20 can be driven to be rotatable by a driving member in the driving box. For example, the driving member may be a motor or a motor and a reduction gear set. The valve body component 10 includes a side wall portion 12 and a cover (not shown), and the side wall portion 12 is fixedly connected to the cover. The side wall portion 12 is a peripheral wall or a part of the peripheral wall of the valve cavity 10. The valve body component 10 has at least three communication holes 101, where at least part of the communication holes 101 are arranged along a circumferential direction of the side wall portion 12, and the number of the communication holes 101 may be plural. For example, in this embodiment, the number of the communication holes 101 can be 8, two rows of communication holes 101 are provided along an axial direction of the side wall portion 12, and each row of communication holes 101 is arranged along the circumferential direction of the side wall portion 12. In some optional embodiments, the number of communication holes 101 may be greater than or less than 8. The sealing component 40 is located between the side wall portion 12 and the valve core component 20, the sealing component 40, the valve core component 20 and the side wall portion 12 can be arranged coaxially. The sealing component 40 has an opening 401, which extends through the sealing component 40 along a height direction of the sealing component 40 and extends through an inner surface and an outer surface of the sealing component 40. The sealing component 40 includes an elastic pad 41 and a sealing member 42, the elastic pad 41 and the sealing member 42 are fixedly connected to form an integral structure, the elastic pad 41 is located between the sealing member 42 and the side wall portion 12 of the valve body component 10, and the sealing member 42 is in contact with the valve core component 20.

In some embodiments, the elastic pad 41 is made of rubber material, the valve body component 10 is made of aluminum material or plastic material by injection molding, the valve core component 20 is made of plastic material by injection molding, the sealing member 42 is made of Teflon, and the elastic pad 41 and the sealing member 42 are fixed by adhesion to form an integral structure. The roughness of a surface, away from the valve core component 20, of the elastic pad 41 is greater than the roughness of a surface, facing the valve core component 20, of the sealing member 42, in this case, the surface, in contact with the valve core component 20, of the sealing member 42 is smoother than the surface, in contact with the side wall portion 12, of the elastic pad 41. The sealing member 42 is made of Teflon, so that the sealing member 42 is not only used for sealing, but also has a certain lubricating performance, which can reduce the friction between the valve core component 20 and the sealing component 40, thereby reducing the driving force of the control valve 200.

Figure 4:
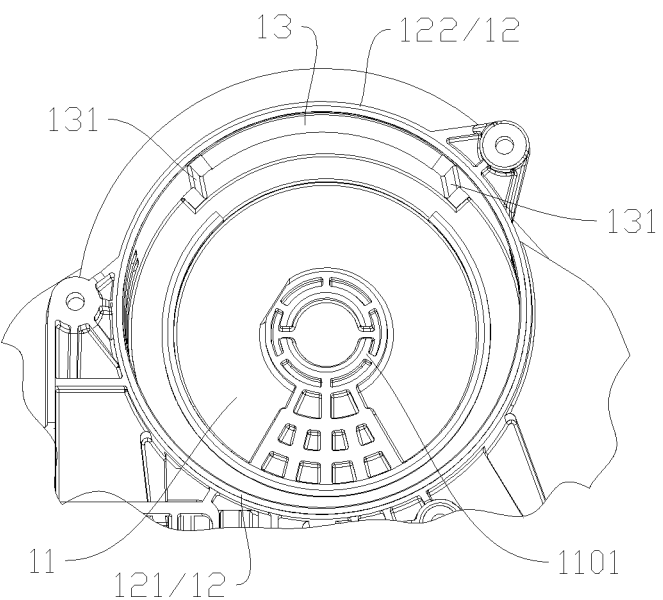
FIG. 4 is a schematic partially perspective view of a valve body component according to the embodiment of the present application.
Figure 5:
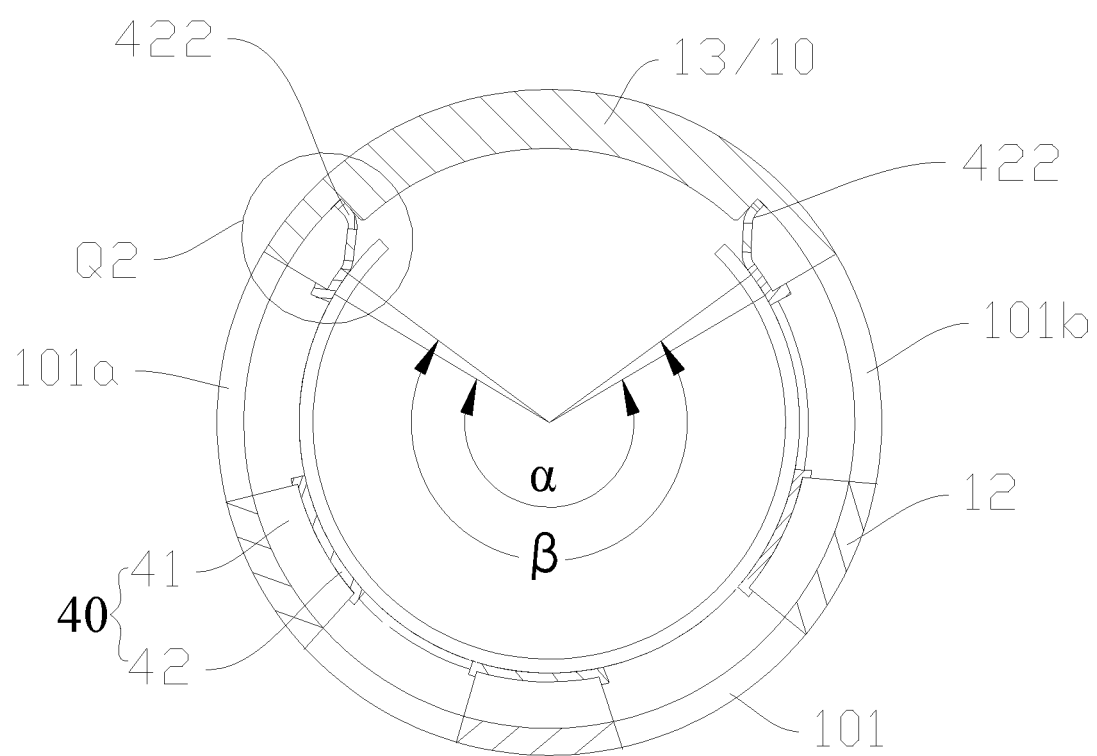
FIG. 5 is a schematic view of a combined structure of the sealing component and the valve body component according to the present application.

As shown in FIGS. 3 to 5, the elastic pad 41 has first through holes 411, the sealing member 42 has second through holes 421, the valve cavity 102 of the control valve 200 is in communication with the communication holes 101 through the second through holes 421 and the first through holes 411, the sealing member 42 includes a sealing main body portion, the second through holes 421 are located in the sealing main body portion, the sealing main body portion is in contact with the valve core component 20, the sealing main body portion includes a fitting portion, the fitting portion is in contact with the valve core component 20. An inner surface of the fitting portion is an arc surface S1 which is in contact with the valve core component 20, and the side wall portion 12 includes a first portion 121 and a second portion 122, which are connected to each other. The first portion 121 and the second portion 122 extend along the circumferential direction of the side wall portion 12, the first portion 121 and the second portion 122 are connected to form the side wall portion 12, the communication holes 101 are located in the first portion 121, edges on two circumferential sides of the first portion 121 are at least partially overlapped with edges of two communication holes 101 which are arranged circumferentially on the outermost side. Edges on two circumferential sides of the second portion 122 form hole walls of the two communication holes 101 which are arranged circumferentially on the outermost side while the sealing component 40 is located between the first portion 121 and the valve core component 20. As shown in FIG. 5, the two communication holes 101 arranged on two circumferential sides of the side wall portion 12 are defined as a first communication hole 101a and a second communication hole 101b, and the first communication hole 101a and the second communication hole 101b are two communication holes adjacent to two sides of the second portion 122. On a cross section perpendicular to the axial direction of the side wall portion 12, a maximum center angle formed by an edge of the first communication hole 101a, an edge of the second communication hole 101b and a center of the side wall portion 12 is defined as $\alpha$, a center angle corresponding to the fitting portion is $\beta$, a rotation tolerance angle of the valve core component 20 is $\theta$, and $\beta \geq \alpha + 2\theta$. Optionally, the rotation tolerance angle of the valve core component 20 is $\pm\theta$, and $\alpha + 2\theta \leq \beta \leq \alpha + 4\theta$. Through the above arrangement, the sealing to the control valve 200 within the rotation tolerance range of the valve core component 20 can be obtained by the sealing component 40, which prevents the valve core component 20 from being separated from the sealing component 40 when the valve core component 20 generates the rotation tolerance due to excessive small angle $\theta$ and thus affecting the sealing performance, and prevents the expansion space of the sealing component 40 from being affected due to the excessive large angle $\theta$, so as to improve the sealing performance of the control valve 200. It can be understood that the center angle $\beta$ corresponding to the arc surface S1 of the sealing component 40 may be greater than $\alpha + 4\theta$, as long as it can realize the sealing performance.

In some embodiments, the rotation tolerance angle of the valve core component 20 may be ±5 degrees, that is, when the driving member stops driving the valve core component 20 to rotate, the valve core component 20 may stop as it rotates by 5 degrees before the set angle or continues to rotate by 5 degrees after exceeding the set angle due to the control accuracy of the driving member or the delay of signal transmission or the influence of the rotation inertia of the valve core component 20, so that the valve core component 20 generates the rotation tolerance. In order to enable the sealing component 40 to be in contact with the valve core component 20 within each travel range of the rotation of the valve core component 20 and allow the sealing component 40 to have a good sealing performance, in the embodiment of the present application, for example as shown in FIG. 1 and FIG. 5, four communication holes 101 are arranged along the circumferential direction of the side wall portion 12, the maximum center angle α formed by the edge of the first communication hole, the edge of the second communication hole, and the center of the side wall portion 12 is greater than or equal to 260 degrees and is less than or equal to 270 degrees, and the center angle β corresponding to the arc surface S1 is greater than or equal to 270 degrees and is less than or equal to 280 degrees.

As shown in FIG. 1, FIG. 3, and FIGS. 6 to 8, in some embodiments, the sealing main body portion includes a hemming portion and the fitting portion 423, the fitting portion 423 is in contact with and in sliding fit with the valve core component 20, the elastic pad 41 has the first through holes 411, the first through holes 411 are in communication with the communication holes 101. The sealing main body portion has the second through holes 421, the hemming portion surrounds the second through hole 421, the second through hole 421 is in communication with the communication hole 101 through the first through hole 411, at least part of the hemming portion is located on an outer side of an accommodating space formed by the sealing main body portion, and the hemming portion includes an outward bending portion 424 and a connecting portion 425. The outward bending portion 424 is located on an outer circumferential side of the second through hole 421 and is connected to the elastic pad 41, the connecting portion 425 is connected between the outward bending portion 424 and the fitting portion 423, and the outward bending portion 424 is located between the inner surface, in contact with the valve core component 20, of the fitting portion 423 and the outer surface, in contact with the side wall portion 12, of the elastic pad 41. The accommodating space formed by the sealing main body portion refers to a circumferential region where the arc surface S1 of the sealing main body portion, which is coaxial with an axis of the side wall portion 12, is located, as shown in the circumferential region with a radius r2 represented by the circular dotted line in FIG. 8. Through the above arrangement, on one hand, the contact area between the elastic pad 41 and the sealing member 42 is increased, which can improve the adhesion force between the elastic pad 41 and the sealing member 42, on the other hand, when the valve core component 20 rotates to the region where the second through hole 421 is located, the collision situation between the valve core component 20 and the edge of the second through hole 421 is improved, so as to prevent the risk of rotation blockage or driving force increase or fluid leakage.

Figure 6:
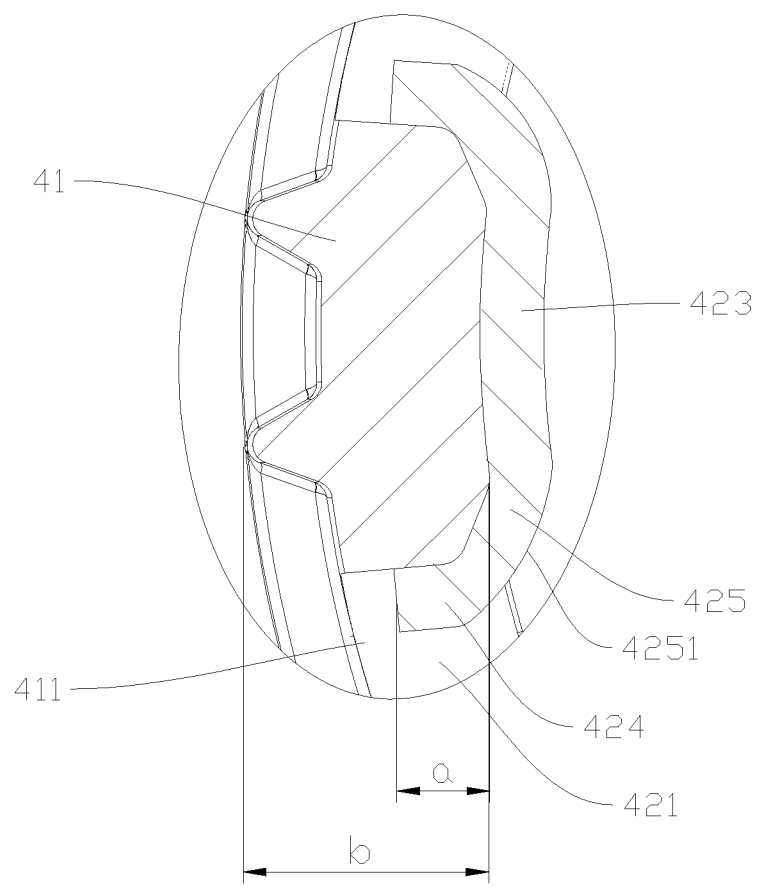
FIG. 6 is a schematic partially enlarged view at a Q1 portion in FIG. 3.
Figure 7:
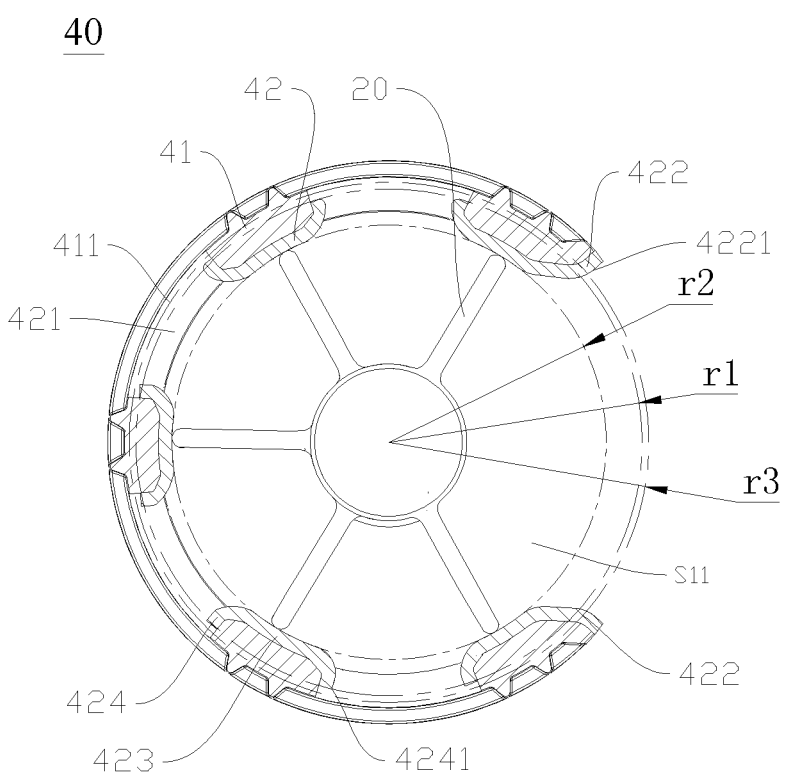
FIG. 7 is a schematic structural view of an assembly of the sealing component and a valve core component according to the present application.

As shown in FIG. 6 and FIG. 7, FIG. 6 and FIG. 7 show a schematic structural view of the sealing component 40 according to an embodiment of the present application. In this embodiment, the hemming portion protrudes from the fitting portion 423 and extends toward a direction close to the elastic pad 41, at least a part of the outward bending portion 424 extends along a radial direction of the side wall portion 12, and at least part of the outward bending portion 424 is inserted into the first through hole 411 and is fixed to an inner wall of the first through hole 411 by adhesion, that is, one end of the outward bending portion 424 is connected to the fitting portion 423 by the connecting portion 425, and the other end of the outward bending portion 424 is inserted into the first through hole 411. A height of the outward bending portion 424 inserted into the first through hole 411 is defined as a, a height of the first through hole 411 is b. Along a thickness direction of the sealing component 40, that is, along a radial direction of the sealing component 40, and the height a of the outward bending portion 424 inserted into the first through hole 411 is less than the height b of the first through hole 411. Through the above arrangement, the sealing member 42 is prevented from contacting the side wall portion 12 when the elastic pad 41 is compressed, so that the elastic pad 41 has more compression space. Furthermore, the arrangement of the hemming portion on the sealing member 42, on one hand, increases a contact area between the elastic pad 41 and the sealing member 42 and improves the adhesive force between the elastic pad 41 and the sealing member 42, on the other hand, the hemming portion 424 is inserted into the first through hole 411, which can limit the position of the sealing member 42 and the elastic pad 41, and prevent the sealing member 42 and the elastic pad 41 from being misplaced when the valve core component 20 rotates.

In order to enable the sealing component 40 to have a good sealing effect, it is necessary for the valve core component 20 to extrude the sealing component 40 to deform the elastic pad 41, so that there is a good sealing between the elastic pad 41 and the side wall portion 12 and between the sealing member 42 and the valve core component 20. Optionally, after the control valve 200 is assembled, a rate of an extrusion deformation of the elastic pad 41 ranges from 12% to 25%, that is, a thickness of the extruded elastic pad 41 is 75% to 88% of a thickness of the elastic pad 41 in a natural state. Based on this, in order to prevent the sealing member 42 from contacting the side wall portion 12 when the elastic pad 41 is compressed by extrusion, the relation between the height a of the outward bending portion 424 inserted into the first through hole 411 and the height b of the first through hole 411 along the thickness direction of the sealing component 40 along the thickness direction of the sealing component 40 satisfy: $a \leq 0.75b$, that is, the height of the outward bending portion 424 protruding from the fitting portion 423 is less than or equal to 0.75 times of the height of the thickness of the elastic pad 41.

Figure 8:
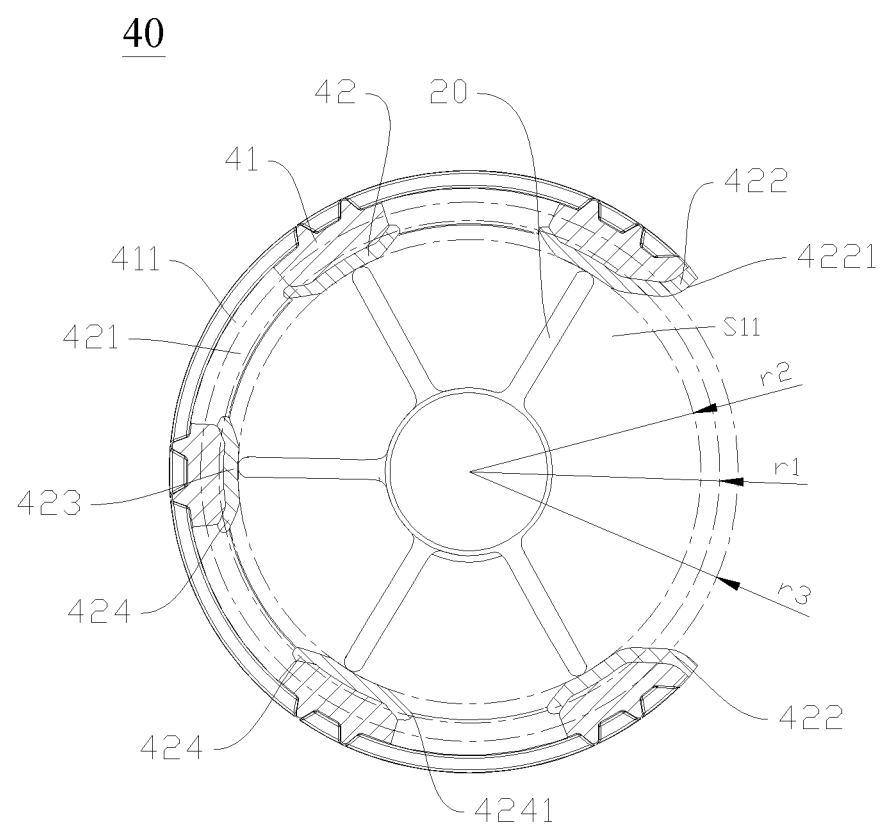
FIG. 8 is a schematic structural view of an assembly of another sealing component and the valve core component according to the present application.
Figure 9:
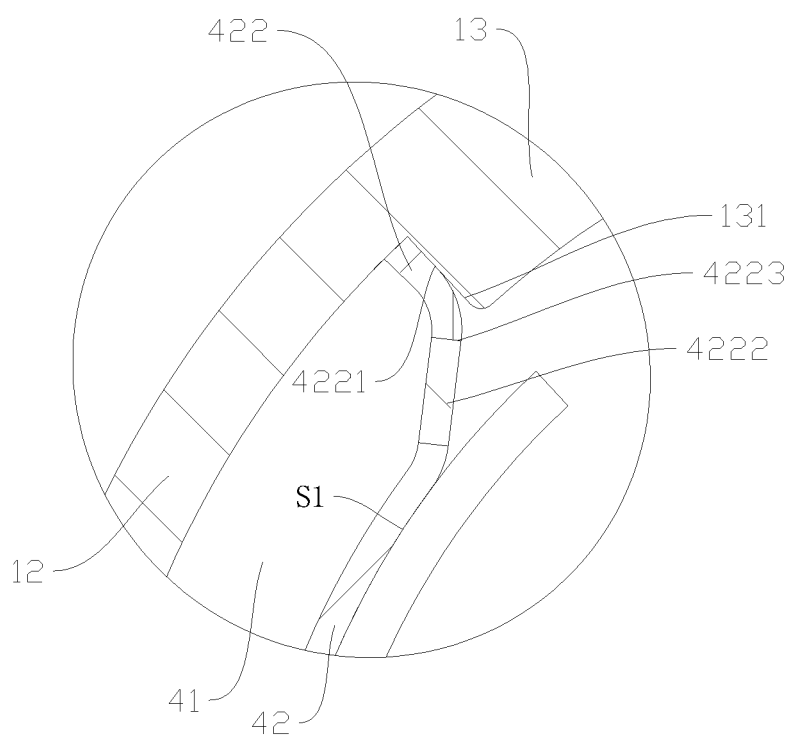
FIG. 9 is a schematic partially enlarged view at a Q2 portion in FIG. 5.
Figure 10:
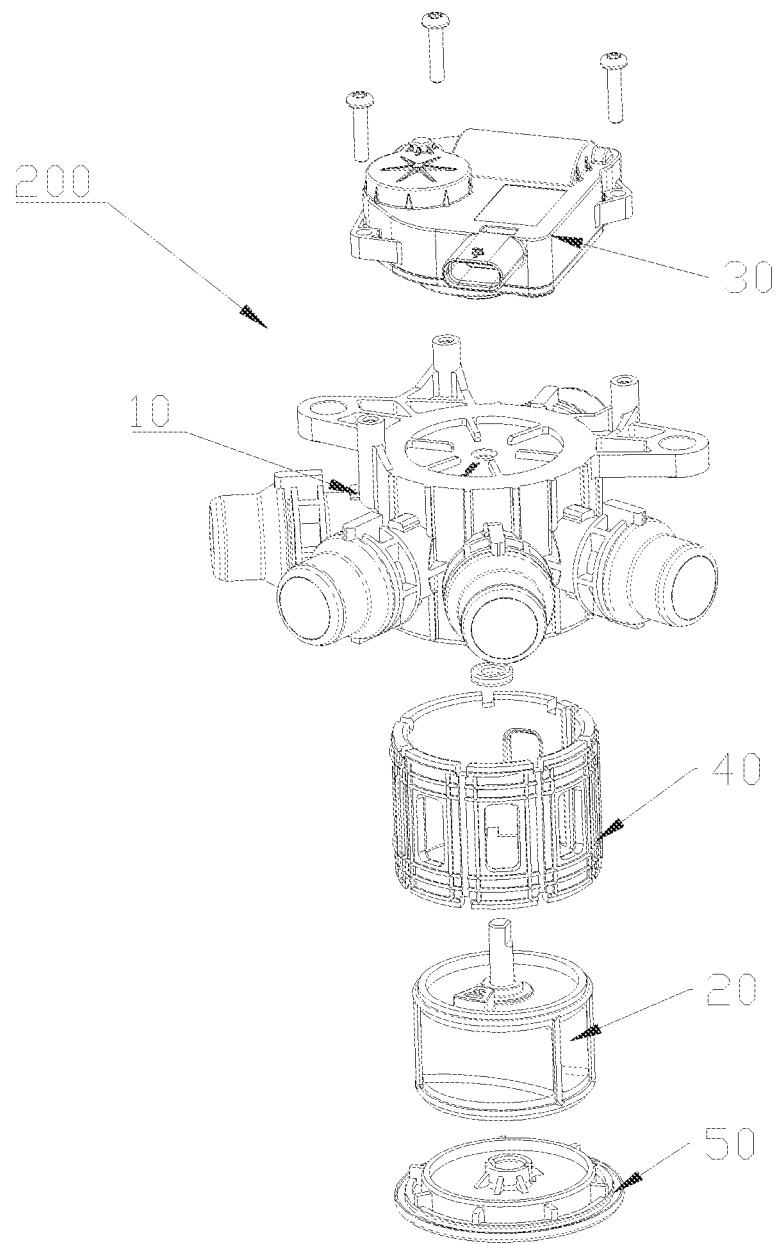
FIG. 10 is a schematic partially exploded view of another control valve according to the present application.
Figure 11:
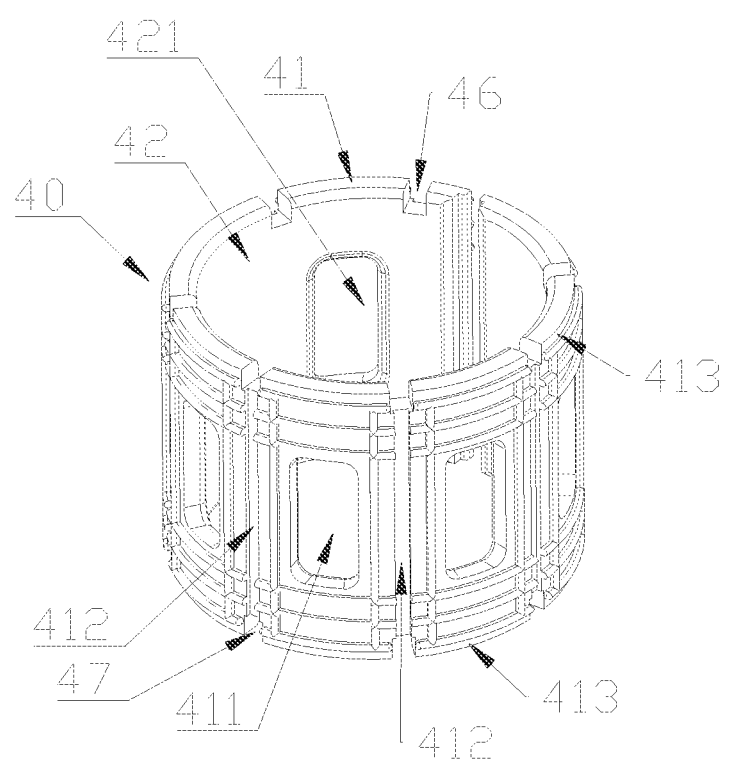
FIG. 11 is a schematic perspective view of the sealing component shown in FIG. 10.

As shown in FIG. 8, FIG. 8 shows a schematic structural view of another sealing member according to an embodiment of the present application. In this embodiment, the first through hole 411 includes an inner wall which extends along the radial direction of the side wall portion 12, the outward bending portion 424 is located between the inner surface of the fitting portion 423 and an end, facing the valve core component 20, of the inner wall, an included angle is formed between a first surface, facing the valve core component 20, of the outward bending portion and a second surface, facing the valve core component 20, of the fitting portion. In this case, the hemming portion 421 may be not inserted into the first through hole 411 of the elastic pad 41, and the first surface of the outward bending portion 424 forms an inclined surface, which can be used to guide the valve core component 20 during rotation of the valve core component 20.

In a case that the rate of the extrusion deformation of the elastic pad 41 ranges from 12% to 25%, the sealing component 40 can have an excellent sealing performance, as shown in FIG. 7 and FIG. 8. The outward bending portion 424 includes a first edge 4241 which is close to the elastic pad 41, and the first edge 4241 is configured toward the valve core component 20. When the valve core component 20 rotates the region where the first through hole 411 is located, it is possible for the first edge 4241 to block the rotation of the valve core component 20 if an edge of the valve core component 20 is in contact with the first edge 4241 of the outward bending portion 424, which may cause the rotation blockage of the valve core component 20 or increase the rotation torque of the valve core component 20.

In order to solve the above problems, in some embodiments, on the cross section of the control valve 200, the cross section is obtained by cutting the control valve 200 along a direction perpendicular to a height direction of the control valve 200, a radius of an arc passing through the first edge 4241 and a center of the side wall portion 12 is defined as r1, a circumferential radius of the valve core component 20 is r2, and r1 >r2. In this case, the edge of the valve core component 20 is not in contact with the first edge 4241 of the outward bending portion 424 when the valve core component 20 extrudes the sealing component 40 and the valve core component 20 rotates, which prevents the first edge 4241 from blocking the valve core component 20, thereby improving the stability of rotation of the valve core component 20.

In some embodiments, the angle between the surface, facing the valve core component of the outward bending portion 424 and the surface, facing the valve core component 20, of the fitting portion 423 is greater than or equal to 90 degrees. In practice, the angle between the surface, facing the valve core component 20, of the outward bending portion 424 and the surface, facing the valve core component 20, of the fitting portion 423 may be set according to the user's needs. For example, the angle may be 90 degrees, 100 degrees or 120 degrees. On the premise of meeting the sealing requirements of the sealing component 40, for example, on the premise that the sealing can be well realized within the rotation tolerance range of the valve core component the angle between the surface, facing the valve core component 20, of the outward bending portion 424 and the surface, facing the valve core component 20, of the fitting portion 423 may be set to be relatively greater, which can simplify the difficulty of manufacturing the sealing component 40.

As shown in FIG. 6 and FIG. 7, the hemming portion of the sealing member 42 further includes a connecting portion 425, which is connected between the outward bending portion 424 and the fitting portion 423. The connecting portion 425 has a connecting surface 4251 which faces the valve core component 20, the connecting surface 4251 is a curved surface, and a diameter of the connecting surface 4251 gradually increases along a direction close to the outward bending portion 424. Through the above arrangement, the connecting portion 425 can be used for buffering and guiding during the rotation of the valve core component 20, which can improve the stability of rotation of the valve core component 20.

As shown in FIG. 5 and FIGS. 7 to 9, in some embodiments, the sealing member 42 can include two position-limiting portions 422 which are fixedly connected to the sealing main body portion, one of position-limiting portions 422 is located on one circumferential side of the sealing main body portion, and the other is located on the other circumferential side of the sealing main body portion. Each position-limiting portion 422 has a first position-limiting surface 4221, and each position-limiting portion 422 protrudes from the sealing main body portion toward the direction close to the elastic pad 41, that is, each position-limiting portion 422 protrudes from the sealing main body portion toward a direction away from the valve core component 20. The valve body component 10 further includes a stop portion 13, the stop portion 13 is fixedly connected to the side wall portion 13 and is located in the valve cavity 102, the stop portion 13 has a second position-limiting surface 131 along a circumferential direction of the stop portion 13, and the first position-limiting surface 4221 is arranged in contact with the second position-limiting surface 131. Through the above arrangement, the first position-limiting surface 4221 is in contact with the second position-limiting surface 131 within the elastic range of the sealing component 40, which limits the sealing component 40 from rotating relative to the valve body component 10. Along the thickness direction of the sealing component 40, a height of the position-limiting portion 422 protruding from the corresponding fitting portion 423 is less than or equal to the thickness of the elastic pad 41, so that the elastic pad 41 can have more expansion space.

In some embodiments, the rate of the extrusion deformation of the elastic pad 41 ranges from 12% to 25%; the position-limiting portion 422 has a transition surface 4222 which is connected between the arc surface S1 of the fitting portion and the first position-limiting surface 4221, and the transition surface 4222 includes a second edge 4221 which is close to the first position-limiting surface 4221. On the cross section of the control valve 200, a radius of an arc passing through the second edge 4223 and the center of the side wall portion 12 is defined as r3, a circumferential radius of the valve core component is r2, and r3>r2. Through the above arrangement, the contact between the edge of the valve core component 20 and the second edge 4223 during the rotation of the valve core component 20 is reduced, which prevents the second edge 4223 from blocking the rotation of the valve core component 20 and causing the rotation blockage of the valve core component 20 or increasing the rotation torque of the valve core component 20, thereby improving the stability of rotation of the valve core component 20.

As shown in FIGS. 10 to 15, another control valve is provided according to an embodiment of the present application, the control valve is similar in structure to the control valve described above. The elastic pad 41 further has first recessed grooves 412 and second recessed grooves 413, openings of the first recessed grooves 412 and the second recessed grooves 413 are configured toward the side wall portion 12, each first recessed groove 412 may extend from one end of the elastic pad 41 to the other end of the elastic pad 42 in a longitudinal direction of the elastic pad 41, and multiple first recessed groove 412 are provided. In this embodiment, the first recessed groove 412 are distributed on two sides of the first through hole 411, and the first recessed groove 412 located between two adjacent first through holes 411 may be located in the middle of a portion located between the two adjacent first through holes 411. The first recessed groove 412 may be arranged axially, the second recessed groove 413 may be arranged circumferentially or in other form, and an expansion space for the elastic pad 41 may be formed through the second recessed groove 413 when it is compressed under force. In this embodiment, the second recessed grooves 413 are located on at least one longitudinal side of the elastic pad 41, and the first recessed grooves 412 are in communication with the second recessed grooves 413.

Figure 12:
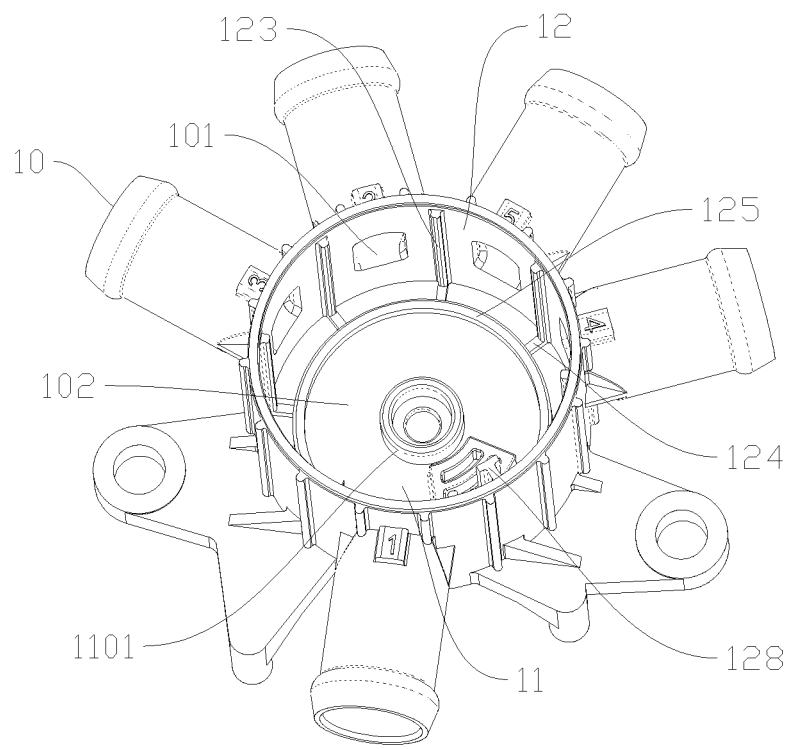
FIG. 12 is a schematic perspective view of the valve body component shown in FIG. 10.

As shown in FIG. 12, the valve body component 10 includes protruding ribs 123 which protrude from the side wall portion 12. In this embodiment, the protruding ribs 123 protrude from the side wall portion 12 and are located in the valve cavity 102. The number of the protruding ribs 123 corresponds to the number of the first recessed groove 412, each protruding rib 123 is inserted into the corresponding first recessed groove 412, and each protruding rib 123 is in interference fit with the corresponding first recessed groove 412. The arrangement of the protruding ribs 123 and the first recessed grooves 412 can realize the positioning and mounting of the sealing component 40, so that the first through hole 411 corresponds to the corresponding communication hole 101 in position, respectively, in order to communicate the fluid. In addition, the fit manner between the protruding ribs 123 and the first recessed grooves 412 can limit a position of the sealing component 40, and prevent the sealing component 40 from shifting when the valve core component rotates. In this embodiment, a height of the protruding rib 123 protruding from the side wall portion 12 is less than a depth of the corresponding first recessed groove 412, so that a certain gap is formed between the protruding rib 123 and a bottom of the corresponding first recessed groove 412. In this way, the elastic pad 41 abuts against the side wall portion 12, and an expansion space for the elastic deformation generated by the elastic pad can be formed by the gap formed between the protruding rib 123 and the bottom of the corresponding first recessed groove 412.

Figure 13:
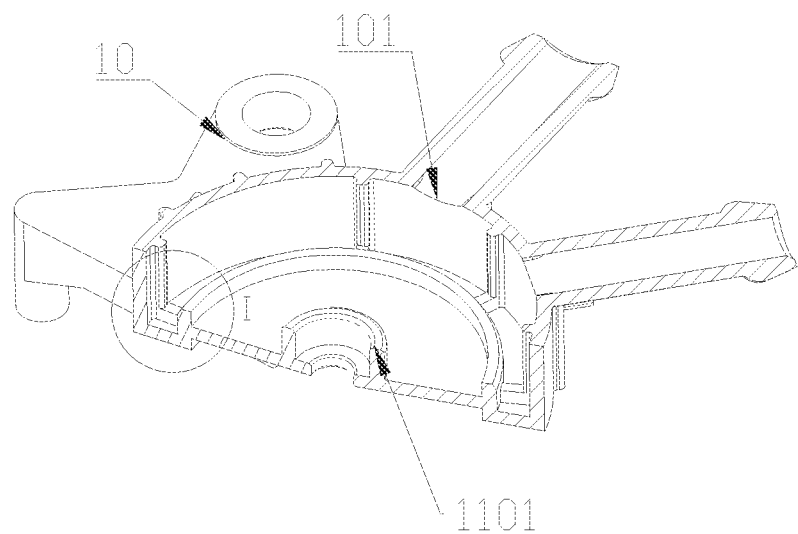
FIG. 13 is a schematic partially cross-sectional view of the valve body component in FIG. 12.
Figure 14:
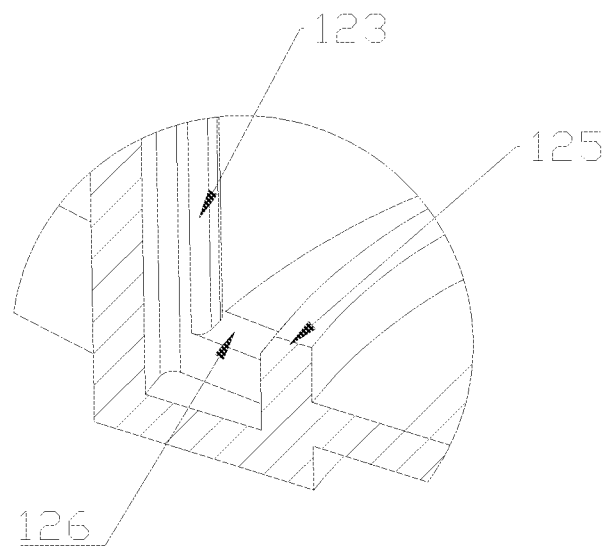
FIG. 14 is a schematic partially enlarged view at an I portion in FIG. 13.
Figure 15:
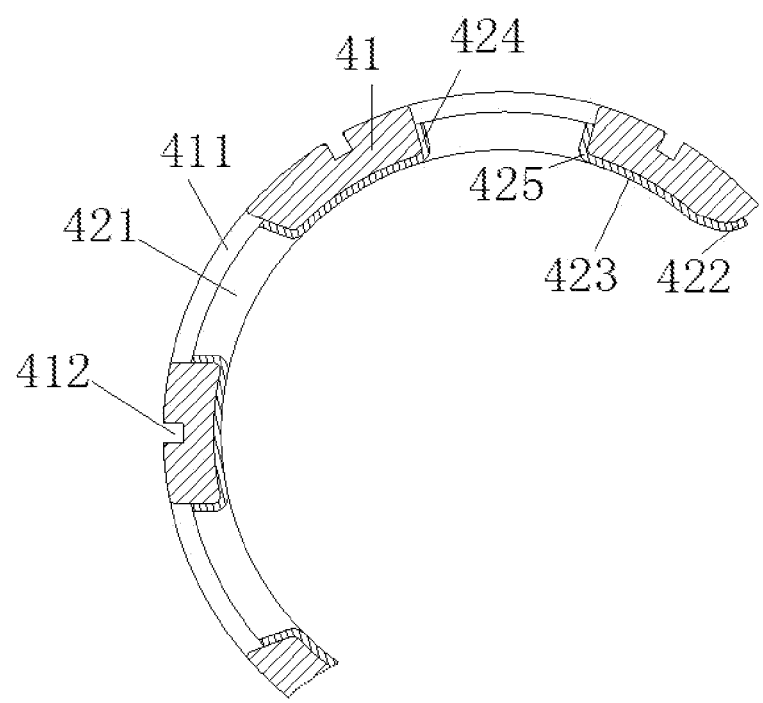
FIG. 15 is a schematic partially cross-sectional view of the sealing component in FIG. 11.

As shown in FIG. 12 to FIG. 14, the valve body component 10 further includes a bottom wall 11 and boss portions 124, the bottom wall 11 is integrally formed with the side wall portion 12, the boss portions 124 protrude from the bottom wall 11, each boss portion 124 includes a blocking portion 125 and a first supporting portion 126, the blocking portion 125 protrudes from the first supporting portion 126 by a set distance, at least part of the first supporting portion 126 is located between the protruding rib 123 and the blocking portion 125, and a position-limiting space 127 is formed between the blocking portion 125 and the protruding rib 123. After the sealing component 40 is assembled into the valve body component 10, one end of the sealing component 40 is accommodated in the position-limiting space 127, the sealing component 40 has first notch portions 46, the first notch portions 46 are located on an end surface of the sealing component and extend toward an interior of the sealing component 40, and the first supporting portion 126 is inserted into the corresponding first notch portion 46 and abuts against the sealing component 40. The arrangement of the boss portions 124 can limit a position of the end of the sealing component 40, and prevent the end of the sealing component 40 from being separated from the valve body component 10.

Referring to FIG. 10, FIG. 13, FIG. 17 and FIG. 18, the control valve 200 further includes a cover 50, the valve body component 10 is provided with a first valve core supporting portion 1101 and a second valve core supporting portion 1102, the first valve core supporting portion 1101 protrudes from the bottom wall 11, the second valve core supporting portion 1102 protrudes from an end surface of the cover 50, a part of the valve core component 20 is inserted into the first valve core supporting portion 1101, another part of the valve core component 20 is inserted into the second valve core supporting portion 1102, and the valve core component 20 is rotatably supported on the first valve core supporting portion 1101 and the second valve core supporting portion 1102; the first valve core supporting portion 1101 and the second valve core supporting portion 1102 both include a notch portion and a rib portion. The second valve core supporting portion 1102 is described as an example, the second valve core supporting portion 1102 includes notch portions 112 and rib plate portions 113, and the arrangement of the notch portions 112 can timely discharge the impurities in the coolant entering the matching portion 111, so as to prevent the valve core component from being stuck. The arrangement of the rib plate portions 113 can improve the strength of the second valve core supporting portion 1102 and reduce the influence of the notch portions 112 on the strength of the second valve core supporting portion 1102. In addition, a height of the second valve core supporting portion 1102 is greater than or equal to a height of the boss portions 124, which can reduce the friction of the valve core component. In addition, the boss portions 124 can prevent the sealing component 40 from being separated from the valve body component 10 when it is compressed and deformed.

The cover 50 further includes second supporting portions 51, one axial end surface of the sealing component 40 is provided with the first notch portions 46, another axial end surface of the sealing component 40 is provided with second notch portions 47, the first supporting portions 126 are inserted into the first notch portions 46 and abut against the sealing component 40, and the second supporting portions 51 are inserted into the second notch portions 47 and abut against the sealing component 40, so as to further limit the position of the sealing component 40.

Figure 16:
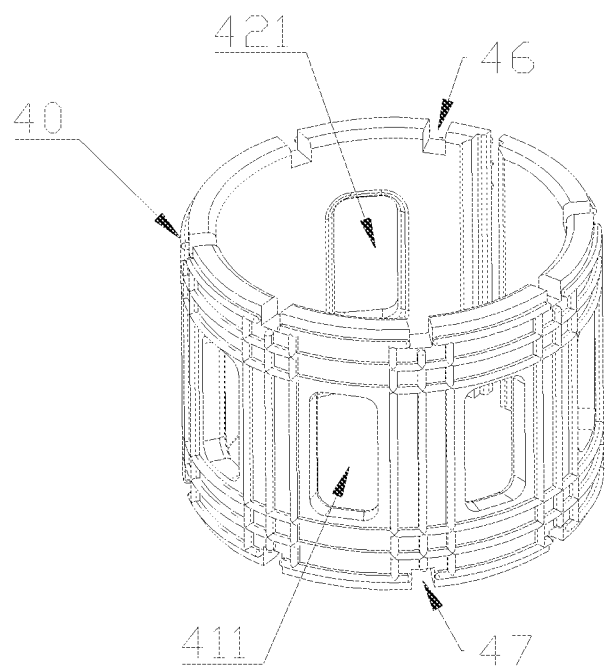
FIG. 16 is a schematic perspective view of a sealing component according to another embodiment of the present application.
Figure 17:
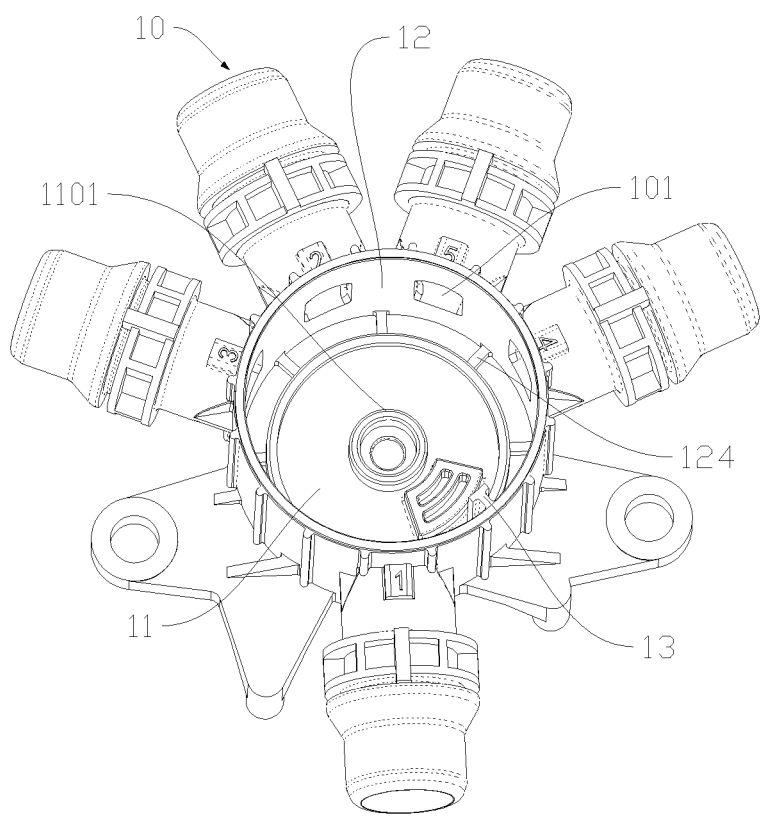
FIG. 17 is a schematic perspective view of the valve body component in FIG. 16.
Figure 18:
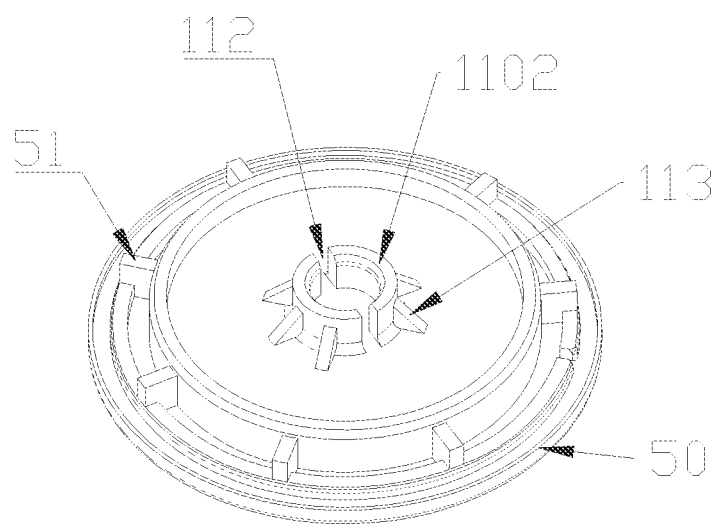
FIG. 18 is a schematic perspective view of a cover of the control valve according to the present application.

Referring to FIG. 16 and FIG. 18, FIG. 16 and FIG. 18 show schematic structural views of the sealing component and the valve body component according to another embodiment of the present application; similar to the structure of the control valve shown in FIGS. 10 to 15, the main difference is that: the sealing component 40 is not provided with the first recessed grooves 412, and the valve body component 10 is not provided with the protruding ribs 123, referring to FIG. 16 and FIG. 17, the sealing component 40 is arranged in the inner cavity of the valve body component 10, and the position-limiting portions 422 of the sealing component 40 are in contact with a side surface of the stop portion 128. The position-limiting portions 422 are in contact with the side surface of the stop portion 128 within the elastic range of the sealing component 40, which can limit the sealing component 40 from rotating relative to the valve body component 10.

In addition, in some embodiments, the first notch portions 46 and the second notch portions 47 may not be provided, and the first supporting portions 126 and the second supporting portions 51 are not provided correspondingly, which can further simplify the structure and reduce the difficulty of assembly.

To sum up, in the control valve 200 provided according to the embodiments of the present application, the sealing component 40 includes the elastic pad 41 and the sealing member 42 that are in an integral structure. The sealing component 40 has the opening 401, and thus the sealing component 40 is in a non-closed structure. The non-closed structure can expand when it is subjected to a radial external force, so that the valve core component 20 and the sealing component 40 have a large expansion space during the extrusion. Compared with the closed annular sealing component, the sealing component 40 provided according to the present disclosure can reduce the design difficulty and manufacturing difficulty. The arc surface of the sealing member 42 is in contact with the valve core component 20, the side wall portion 12 includes the first portion 121 which extends along the circumferential direction of the side wall portion, and the communication holes 101 are located in the first portion 121. By configuring the maximum center angle $\alpha$, which is formed by passing through the edges of the two communication holes on two circumferential sides of the side wall portion and the center of the side wall portion, the center angle $\theta$ corresponding to the arc surface S1 of the fitting portion, and the rotation tolerance angle $\theta$ of the valve core component 20 to satisfy: $\beta \geq \alpha + 2\theta$, the sealing component 40 can realize the sealing of the control valve 200 within the rotation tolerance range of the valve core component 20, thereby improving the sealing performance of the control valve 200 and facilitating popularization and application.

It should be noted that although the present application has been described herein in detail with reference to the above embodiments, those of ordinary skill in the art should understand that those skilled in the art may still modify or equivalently replace the present application, and all technical solutions and its improvements that do not apart from the spirit and scope of the present application should be covered by the scope of the claims of the present application.

The invention claimed is:

1. A control valve, comprising a valve body component and a valve core component, wherein the control valve has a valve cavity, at least part of the valve core component is located in the valve cavity, the valve core component is driven to be rotatable; the valve body component comprises a side wall portion, the side wall portion is a peripheral wall or at least a part of the peripheral wall of the valve cavity, the side wall portion has at least three communication holes which are in communication with the valve cavity, wherein the control valve further comprises a sealing component, the sealing component is located between the side wall portion and the valve core component, the sealing component comprises an elastic pad and a sealing member, the elastic pad and the sealing member are fixedly connected to form an integral structure, the elastic pad is located between the sealing member and the side wall portion, the sealing member comprises a sealing main body portion, the sealing main body portion comprises a hemming portion and a fitting portion which are connected to each other, the fitting portion is in contact with and in sliding fit with the valve core component, the elastic pad has first through holes, the first through holes are in communication with the communication holes, the sealing member has second through holes, the second through holes are in communication with the communication holes through the first through holes, the hemming portion comprises an outward bending portion which surrounds the corresponding second through hole and is connected to the elastic pad, and the outward bending portion is located between an inner surface, in contact with the valve core component, of the fitting portion and an outer surface, in contact with the side wall portion, of the elastic pad.

2. The control valve according to claim 1, wherein the hemming portion extends from the fitting portion toward a direction close to the elastic pad, at least a part of the outward bending portion extends along a radial direction of the side wall portion, and at least another part of the outward bending portion is inserted into the corresponding first through hole and is fixed to an inner wall of the corresponding first through hole by adhesion, and a height of the outward bending portion inserted into the corresponding first through hole is less than a height of the corresponding first through hole along a thickness direction of the sealing component;

or, the first through hole comprises an inner wall which extends along a radial direction of the side wall portion, and the outward bending portion is located between the inner surface of the fitting portion and an end, facing the valve core component, of the inner wall of the first through hole.

3. The control valve according to claim 2, wherein at least the part of the outward bending portion is inserted into the corresponding first through hole, a rate of an extrusion deformation of the elastic pad ranges from 12% to 25%, a height of the outward bending portion inserted into the corresponding first through hole is defined as a, and a height of the first through hole is b; along the thickness direction of the sealing component, $a \leq 0.75b$.

4. The control valve according to claim 3, wherein the sealing member further comprises two position-limiting portions which are fixedly connected to the sealing main body portion, one position-limiting portion is located on one circumferential side of the sealing main body portion, the other position-limiting portion is located on the other circumferential side of the sealing main body portion, each position-limiting portion has a first position-limiting surface, and each position-limiting portion protrudes from the sealing main body portion toward a direction close to the elastic pad;

the valve body component further comprises a stop portion, the stop portion is fixedly connected to the side wall portion and is located in the valve cavity, the stop portion has a second position-limiting surface along a circumferential direction of the stop portion, and the first position-limiting surface is arranged in contact with the second position-limiting surface;

a height of the position-limiting portion protruding from the corresponding fitting portion is less than or equal to a thickness of the elastic pad along a thickness direction of the sealing component.

5. The control valve according to claim 3, wherein at least a part of the communication holes are arranged along a circumferential direction of the side wall portion, the side wall portion comprises a first portion and a second portion, the communication holes are all located in the first portion, wherein the sealing component is located between the valve core component and the first portion, two communication holes adjacent to two sides of the second portion are defined as a first communication hole and a second communication hole, respectively; wherein, on a cross section perpendicular to an axial direction of the side wall portion, a maximum center angle, which is formed by passing through an edge of the first communication hole, an edge of the second communication hole, and a center of the side wall portion, is defined as $\alpha$, the inner surface of the fitting portion is an arc surface, a center angle corresponding to the fitting portion is defined as $\beta$, a rotation tolerance angle of the valve core component is defined as $\theta$, and $\beta \geq \alpha + 2\theta$.

6. The control valve according to claim 2, wherein the sealing member further comprises two position-limiting portions which are fixedly connected to the sealing main body portion, one position-limiting portion is located on one circumferential side of the sealing main body portion, the other position-limiting portion is located on the other circumferential side of the sealing main body portion, each position-limiting portion has a first position-limiting surface, and each position-limiting portion protrudes from the sealing main body portion toward a direction close to the elastic pad;

the valve body component further comprises a stop portion, the stop portion is fixedly connected to the side wall portion and is located in the valve cavity, the stop portion has a second position-limiting surface along a circumferential direction of the stop portion, and the first position-limiting surface is arranged in contact with the second position-limiting surface;

a height of the position-limiting portion protruding from the corresponding fitting portion is less than or equal to a thickness of the elastic pad along a thickness direction of the sealing component.

7. The control valve according to claim 2, wherein at least a part of the communication holes are arranged along a circumferential direction of the side wall portion, the side wall portion comprises a first portion and a second portion, the communication holes are all located in the first portion, wherein the sealing component is located between the valve core component and the first portion, two communication holes adjacent to two sides of the second portion are defined as a first communication hole and a second communication hole, respectively; wherein, on a cross section perpendicular to an axial direction of the side wall portion, a maximum center angle, which is formed by passing through an edge of the first communication hole, an edge of the second communication hole, and a center of the side wall portion, is defined as α, the inner surface of the fitting portion is an arc surface, a center angle corresponding to the fitting portion is defined as β, a rotation tolerance angle of the valve core component is defined as θ, and β≥α+2θ.

8. The control valve according to claim 1, wherein a rate of an extrusion deformation of the elastic pad ranges from 12% to 25%;
the outward bending portion comprises a first edge, which faces the valve core component, the first edge surrounds the corresponding second through hole; on a cross section of the control valve, a radius of an arc passing through the first edge and a center of the side wall portion is defined as r1, a circumferential radius of the valve core component is defined as r2, and r1>r2;
an angle between a surface, facing the valve core component, of the outward bending portion and a surface, facing the valve core component, of the fitting portion is greater than or equal to 90 degrees.

9. The control valve according to claim 8, wherein the sealing member further comprises two position-limiting portions which are fixedly connected to the sealing main body portion, one position-limiting portion is located on one circumferential side of the sealing main body portion, the other position-limiting portion is located on the other circumferential side of the sealing main body portion, each position-limiting portion has a first position-limiting surface, and each position-limiting portion protrudes from the sealing main body portion toward a direction close to the elastic pad;
the valve body component further comprises a stop portion, the stop portion is fixedly connected to the side wall portion and is located in the valve cavity, the stop portion has a second position-limiting surface along a circumferential direction of the stop portion, and the first position-limiting surface is arranged in contact with the second position-limiting surface;
a height of the position-limiting portion protruding from the corresponding fitting portion is less than or equal to a thickness of the elastic pad along a thickness direction of the sealing component.

10. The control valve according to claim 8, wherein the sealing member further comprises two position-limiting portions which are fixedly connected to the sealing main body portion, one position-limiting portion is located on one circumferential side of the sealing main body portion, the other position-limiting portion is located on the other circumferential side of the sealing main body portion, each position-limiting portion has a first position-limiting surface, and each position-limiting portion protrudes from the sealing main body portion toward a direction close to the elastic pad;
the valve body component further comprises a stop portion, the stop portion is fixedly connected to the side wall portion and is located in the valve cavity, the stop portion has a second position-limiting surface along a circumferential direction of the stop portion, and the first position-limiting surface is arranged in contact with the second position-limiting surface;
a height of the position-limiting portion protruding from the corresponding fitting portion is less than or equal to a thickness of the elastic pad along a thickness direction of the sealing component.

11. The control valve according to claim 8, wherein at least a part of the communication holes are arranged along a circumferential direction of the side wall portion, the side wall portion comprises a first portion and a second portion, the communication holes are all located in the first portion, wherein the sealing component is located between the valve core component and the first portion, two communication holes adjacent to two sides of the second portion are defined as a first communication hole and a second communication hole, respectively; wherein, on a cross section perpendicular to an axial direction of the side wall portion, a maximum center angle, which is formed by passing through an edge of the first communication hole, an edge of the second communication hole, and a center of the side wall portion, is defined as a, the inner surface of the fitting portion is an arc surface, a center angle corresponding to the fitting portion is defined as β, a rotation tolerance angle of the valve core component is defined as θ, and β≥α+2θ.

12. The control valve according to claim 1, wherein the hemming portion further comprises a connecting portion, the connecting portion is connected between the outward bending portion and the fitting portion, the connecting portion has a connecting surface which faces the valve core component, the connecting surface is a curved surface, and a diameter of the connecting surface gradually increases along a direction close to the outward bending portion.

13. The control valve according to claim 12, wherein at least a part of the communication holes are arranged along a circumferential direction of the side wall portion, the side wall portion comprises a first portion and a second portion, the communication holes are all located in the first portion, wherein the sealing component is located between the valve core component and the first portion, two communication holes adjacent to two sides of the second portion are defined as a first communication hole and a second communication hole, respectively; wherein, on a cross section perpendicular to an axial direction of the side wall portion, a maximum center angle, which is formed by passing through an edge of the first communication hole, an edge of the second communication hole, and a center of the side wall portion, is defined as a, the inner surface of the fitting portion is an arc surface, a center angle corresponding to the fitting portion is defined as β, a rotation tolerance angle of the valve core component is defined as θ, and β≥α+2θ.

14. The control valve according to claim 1, wherein the sealing member further comprises two position-limiting portions which are fixedly connected to the sealing main body portion, one position-limiting portion is located on one circumferential side of the sealing main body portion, the other position-limiting portion is located on the other circumferential side of the sealing main body portion, each position-limiting portion has a first position-limiting surface, and each position-limiting portion protrudes from the sealing main body portion toward a direction close to the elastic pad;
the valve body component further comprises a stop portion, the stop portion is fixedly connected to the side wall portion and is located in the valve cavity, the stop portion has a second position-limiting surface along a circumferential direction of the stop portion, and the first position-limiting surface is arranged in contact with the second position-limiting surface;

a height of the position-limiting portion protruding from the corresponding fitting portion is less than or equal to a thickness of the elastic pad along a thickness direction of the sealing component.

15. The control valve according to claim 14, wherein a rate of an extrusion deformation of the elastic pad ranges from 12% to 25%;

the position-limiting portion has a transition surface which is connected between the inner surface of the fitting portion and the first position-limiting surface, the transition surface comprises a second edge which is close to the first position-limiting surface; wherein, on a cross section of the control valve, a radius of an arc passing through the second edge and a center of the side wall portion is defined as r3, a circumferential radius of the valve core component is defined as r2, and r3>r2.

16. The control valve according to claim 1, wherein at least a part of the communication holes are arranged along a circumferential direction of the side wall portion, the side wall portion comprises a first portion and a second portion, the communication holes are all located in the first portion, wherein the sealing component is located between the valve core component and the first portion, two communication holes adjacent to two sides of the second portion are defined as a first communication hole and a second communication hole, respectively; wherein, on a cross section perpendicular to an axial direction of the side wall portion, a maximum center angle, which is formed by passing through an edge of the first communication hole, an edge of the second communication hole, and a center of the side wall portion, is defined as $\alpha$, the inner surface of the fitting portion is an arc surface, a center angle corresponding to the fitting portion is defined as $\beta$, a rotation tolerance angle of the valve core component is defined as $\theta$, and $\beta \geq \alpha + 2\theta$.

17. The control valve according to claim 16, wherein the rotation tolerance angle of the valve core component is ±5 degrees; four communication holes are arranged along the circumferential direction of the side wall portion, the center angle corresponding to the inner surface of the fitting portion is greater than or equal to 270 degrees and is less than or equal to 280 degrees.

18. The control valve according to claim 1, wherein the elastic pad is made of rubber material, the valve body component is made of aluminum material or plastic material by injection molding, the valve core component is made of plastic material by injection molding, the sealing member is made of Teflon, and the elastic pad is fixed to the sealing member by adhesion, and a roughness of a surface, away from the valve core component, of the elastic pad is greater than a roughness of a surface, facing the valve core component, of the sealing member.

* * * * *